United States Patent
Choi

(10) Patent No.: US 9,377,945 B2
(45) Date of Patent: Jun. 28, 2016

(54) METHOD AND APPARATUS FOR MANAGING FILE USING THUMBNAIL

(71) Applicant: Samsung Electronics Co., Ltd., Gyeonggi-do (KR)

(72) Inventor: Minsheok Choi, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 230 days.

(21) Appl. No.: 14/259,667

(22) Filed: Apr. 23, 2014

(65) Prior Publication Data
US 2014/0330872 A1   Nov. 6, 2014

(30) Foreign Application Priority Data
May 2, 2013   (KR) .................. 10-2013-0049134

(51) Int. Cl.
*G06F 3/00* (2006.01)
*G06F 17/30* (2006.01)
*G06F 3/0488* (2013.01)
*G06F 3/0484* (2013.01)
*G06F 3/0486* (2013.01)

(52) U.S. Cl.
CPC ............ *G06F 3/0488* (2013.01); *G06F 3/0486* (2013.01); *G06F 3/04842* (2013.01); *G06F 17/30126* (2013.01)

(58) Field of Classification Search
CPC .................. G06F 3/0488; G06F 17/30126
USPC .......................................... 707/805
See application file for complete search history.

(56) References Cited

U.S. PATENT DOCUMENTS

2011/0252374 A1* 10/2011 Chaudhri ............ G06F 3/04817
715/835

\* cited by examiner

*Primary Examiner* — Alexey Shmatov
(74) *Attorney, Agent, or Firm* — Cha & Reiter, LLC

(57) ABSTRACT

A method and an electronic device for managing a file of a terminal by using thumbnails is disclosed. The method and electronic device include displaying thumbnails, each thumbnail representing at least one file stored in the electronic device, in response to a movement command, changing a display position of a selected first thumbnail to at least part of a display position of a second thumbnail, detecting whether a first storage route of a first file of the first thumbnail is identical to a second storage route of a second file of the second thumbnail, and when the first storage route is not identical to the second storage route, changing the first storage route to the second storage route for the first file.

14 Claims, 9 Drawing Sheets

METHOD AND APPARATUS FOR MANAGING FILE USING THUMBNAIL

CROSS-REFERENCE TO RELATED APPLICATION

This application claims priority from and the benefit under 35 U.S.C. §119(a) of Korean Patent Application No. 10-2013-0049134, filed on May 2, 2013, which is hereby incorporated by reference for all purposes as if fully set forth herein.

TECHNICAL FIELD

The present disclosure relates generally to a method and an apparatus for managing a file using a thumbnail, and more particularly, to a method and an apparatus for changing a storage route of a file by moving a thumbnail of a file displayed on a screen.

BACKGROUND

A file including an image, a video, a document, and the like may be stored in a user device, such as a Personal Computer (PC) and a smart phone. Each file has a storage "route." To illustrate, a user may create a folder as storage space for storing one or more files. A storage "route" of the file is a path of directories leading to the folder in which the corresponding file is stored. Accordingly, storage routes of files stored in the same folder are the necessarily the same, and files stored in different folders have different storage routes, respectively.

When files are stored in a plurality of folders as described above, it is more difficult to display files stored in the different folders in a single display region. That is, the files in a single file folder having the same storage route are always displayed together.

In this case, when one desires to change the storage route of the file, a separate file movement or copy function may be used. For example, when moving a file stored in folder A to folder B, a storage route of the file may be changed by dragging the file from within folder A, and then dropping the file into folder B. Alternatively, cut/copy and paste functions for the corresponding file may also be used to effect a change in the storage route.

Furthermore, all of the image files photographed by a portable device, such as a smart phone, are generally stored in one folder, and in order to move the image file to a specific folder, a process of selecting a folder, in which the image file is desired to be stored, by using a separate menu item is performed. Accordingly, there is a problem in that a user inconveniently manages the file.

SUMMARY

The present disclosure provides a method of conveniently changing storage routes of files having different storage routes.

In accordance with an aspect of the present disclosure, a method of managing a file of a terminal by using a thumbnail is provided. The method includes displaying thumbnails, each thumbnail representing at least one file stored in the electronic device, in response to a movement command, changing a display position of a selected first thumbnail to at least part of a display position of a second thumbnail, detecting whether a first storage route of a first file of the first thumbnail is identical to a second storage route of a second file of the second thumbnail, and when the first storage route is not identical to the second storage route, changing the first storage route to the second storage route for the first file.

In accordance with another aspect of the present disclosure, an electronic device for managing files is provided. The apparatus includes a display unit configured to display thumbnails representing files stored in the electronic device, and a controller configured to display thumbnails, each thumbnail representing one file stored in the electronic device, in response to a movement command, change a display position of a selected first thumbnail to at least part of a display position of a second thumbnail, detect whether a first storage route of a first file of the first thumbnail is identical to a second storage route of a second file of the second thumbnail, and when the first storage route is not identical to the second storage route, changing the first storage route to the second storage route for the first file.

According to the method and the electronic device for managing a file by using a thumbnail, it is possible to display thumbnails of all of the files on one screen regardless of storage routes of the files, and easily and conveniently change the storage route of the file through movement of the thumbnail.

BRIEF DESCRIPTION OF THE DRAWINGS

The present disclosure will be more apparent from the following detailed description in conjunction with the accompanying drawings, in which.

DETAILED DESCRIPTION

Hereinafter, example embodiments of the present disclosure will be described in detail with reference to the accompanying drawings.

Figure 1:
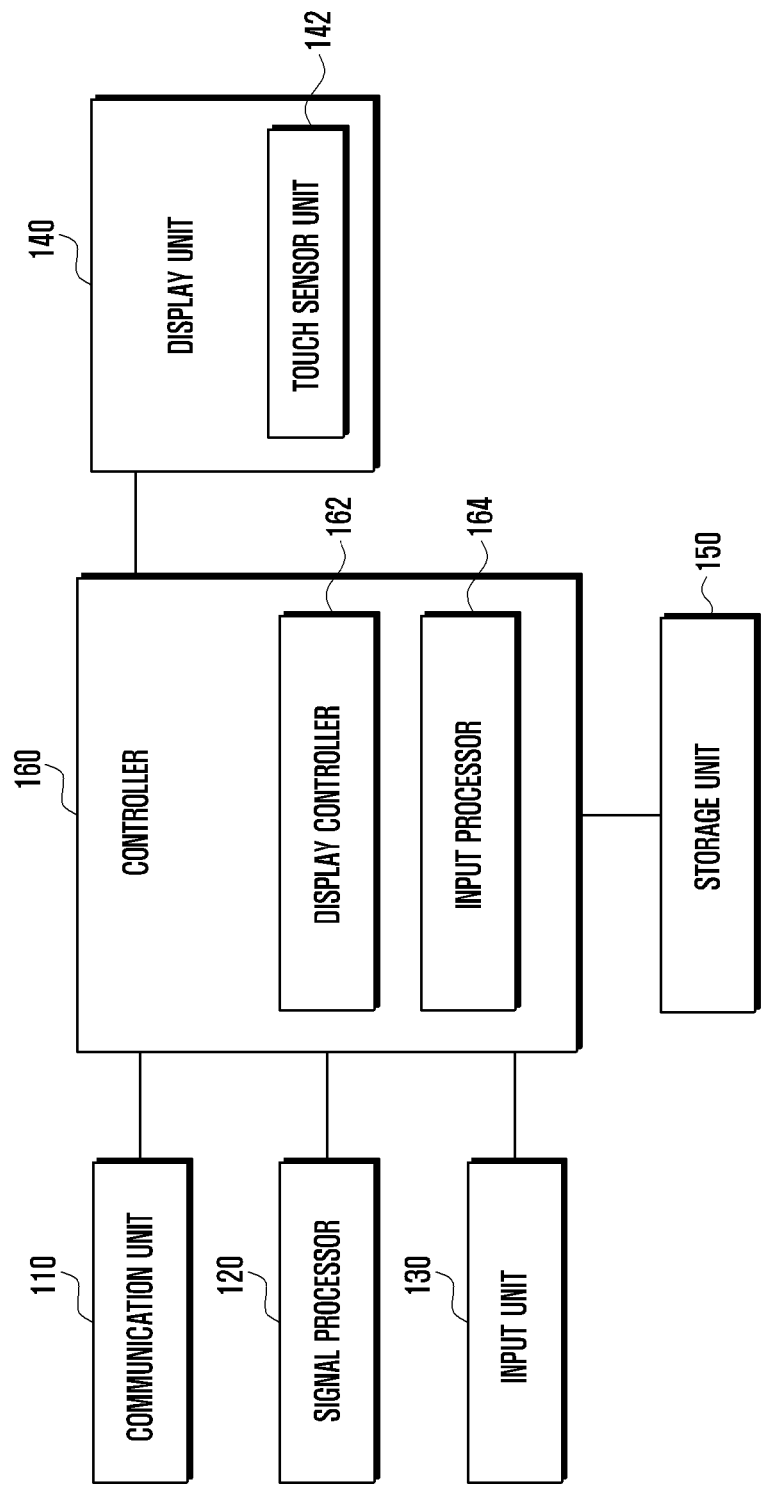
FIG. 1 is a block diagram illustrating an internal structure of a terminal according to an example embodiment of the present disclosure.

FIG. 1 is a block diagram illustrating an internal structure of a terminal according to an example embodiment of the present disclosure.

Referring to FIG. 1, a terminal according to the present disclosure may include a communication unit 110, a signal processor 120, an input unit 130, a display unit 140, a storage unit 150, and a controller 160. Here, the communication unit 110 and the signal processor 120 are elements for supporting a communication function of the terminal, and when the present disclosure is applied to a terminal having no communication function, the communication unit 110 and the signal processor 120 may be omitted.

The communication unit 110 performs a data transceiving function for communication of the terminal 100. For example, the communication unit 110 may include an RF transmitter up-converting and amplifying a frequency of a transmitted signal, an RF receiver low-noise amplifying a received signal and down-converting a frequency, and the like. Further, the communication unit 110 may receive data through a wired/wireless channel to output the received data to the controller 160, and transmit data output from the controller 160 through the wired/wireless channel.

Further, the signal processor 120 may be formed of a codec, and converts a digital signal into an analog signal and an analog signal into a digital signal through the codec.

The input unit 130 receives a manipulation of a user for controlling the terminal and generates the input signal to transmit the generated input signal to the controller 160. The input unit 130 may be implemented with a key pad including number keys, direction keys, and the like, or a mouse device, and when the terminal is a portable device, a predetermined function key may be integrally formed with the display unit 140 according to the example embodiment of the present disclosure. Further, when the display unit 140 according to the example embodiment of the present disclosure is implemented by a touch type display, the key input unit 140 may be altered, reduced or omitted.

The display unit 140 visually provides a user with a menu of the terminal, input data, function setting information, and other various information. The display unit 140 may perform functions such as displaying a booting screen image, an idle screen image, a menu screen image, a call screen image, or other application screen images of the terminal. Further, in the example embodiment of the present disclosure, the display unit 140 may display thumbnails of files stored in the terminal and storage routes of the files, movement of a thumbnail in response to a received command, or a changed storage route.

The display unit 140 may be formed of a Liquid Crystal Display (LCD), an Organic Light Emitting Diode (OLED), an Active Matrix Organic Light Emitting Diode (AMOLED), a flexible display, a 3D display, and the like.

When the display unit 140 is implemented by a touch type display, the display unit 140 may further include a touch sensor unit 142. The touch sensor unit 142 converts a change in a pressure applied to a specific area or capacity generated at a specific area into an electrical input signal. In this case, the touch sensor unit 142 may detect a pressure when a touch is made, as well as a touch position and a touched area.

The touch sensor unit 142 may detect a touch input of a user and generate a detection signal, transmitting the generated detection signal to the controller 160. The detection signal may include information including, for example, the coordinates of a touch of the user. When the user moves the touch in a state where continuous touch is applied to the display unit 140 (that is, a "drag" gesture operation), the touch sensor 142 generates a detection signal including coordinate information about a movement route and transmits the generated detection signal to the controller 160.

The touch sensor unit 142 may be formed of a touch detecting sensor utilizing, for example, a capacitive overlay implementation, a resistive overlay implementation, a surface acoustic wave implementation, an infrared beam implementation, and the like, or a pressure detecting implementation (such as a pressure sensor). In addition to the aforementioned sensors, all types of sensor devices capable of detecting a touch or a pressure of an object may be applied to the touch sensor unit 142 of the present disclosure.

The storage unit 150 may serve to store a program and data for an operation of the terminal, and may be divided into a program region and a data region. The program region may store a program controlling a general operation of the terminal and an Operating System (OS) for booting a portable terminal, an application program for reproduction of multimedia contents and the like, an application program for other optional functions of the terminal, for example, a voice communication function, a camera function, a sound reproduction function, an image or video reproduction function, and the like. The data region is a region in which a file generated according to use of the terminal or received from the outside is stored, and may store an image file, a video file, an audio file, a document file, and the like.

Further, in the example embodiment of the present disclosure, the storage unit 150 stores files generated in the terminal or received from the outside. An identifier and a storage route of each of the stored files are transmitted to the controller 160. Here, the storage route of the file may be a route leading to the desired file, starting from the highest folder in a directory and leading to the lowest folder in which a file is positioned in the data region of the storage unit 150 as described above.

The controller 160 controls a generation operation of each element of the terminal. Further, in the example embodiment of the present disclosure, the controller 160 may further include a display controller 162 and an input processor 164. The display controller 162 displays a thumbnail and a storage route of a file stored in the storage unit 150 through the display unit 140. The input processor 164 changes a storage route of a file in response to a command input through the input unit 130 or the display unit 140.

Hereinafter, a method of managing a file according to an example embodiment of the present disclosure will be described in detail.

The controller 160 displays a thumbnail representing a file stored in the storage unit 150, and displays the storage route of the file together with the thumbnail via the display unit 140. Here, the controller 160 may return display of the thumbnail of the file stored in the storage unit 150 in response to a file search operation of the terminal.

The files displayed as thumbnails are not limited to a single storage route or a single specific folder. In other words, the thumbnails of all files stored in the storage unit 150 may be displayed. Furthermore, the displayed files are not limited to any specific type (such as image files or video files), and accordingly, all file types may be displayed. Alternatively, display of only a specific type of files may be implemented according to a user setting.

Furthermore, the storage route of the file and the thumbnail may be displayed such that different storage routes are visually differentiated. For example, a file thumbnail may have its corresponding storage route indicated via a color or a pattern surrounding the thumbnail. As another example embodiment, a sign or symbol, such as an icon, may be displayed around the thumbnail to indicate the particular storage route, and a name of the lowest folder in which the file is stored may be displayed together with the thumbnail. The present disclosure is not limited to these examples, and any display method capable of visually differentiating the storage routes of the respective files may be implemented as desired.

Figure 2:
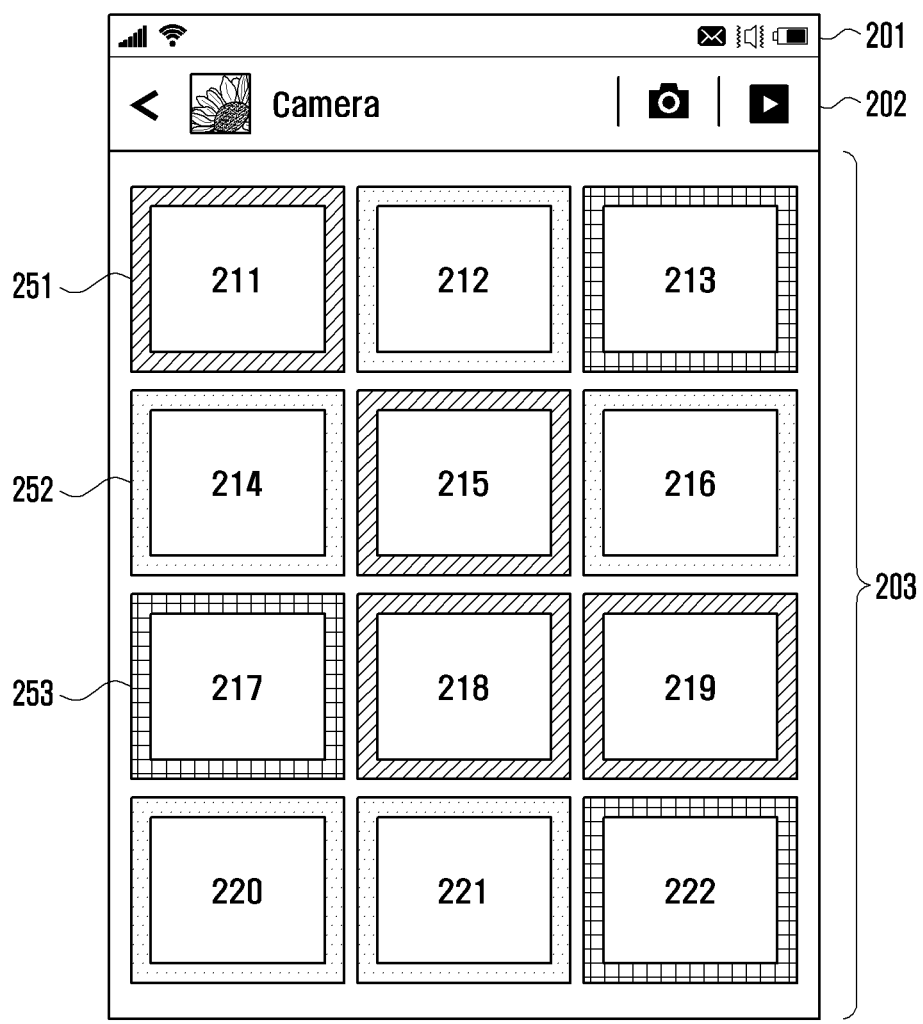
FIG. 2 is a diagram illustrating one example embodiment of thumbnails and storage routes displayed through a display unit.

FIG. 2 is a diagram illustrating one example embodiment of thumbnails and storage routes displayed through the display unit 140.

Referring to FIG. 2, the display unit 140 may be divided into a state display region 201, a function display region 202, and a thumbnail display region 203. The state display region 201 is a region in which currently executing functions of the terminal, a current state of the terminal, and the like are displayed, and the function display region 202 is a region showing that thumbnails 211 to 222 of files are displayed in the thumbnail display region 203. For example, when the thumbnails 211 to 222 of image files photographed by a camera of the terminal are displayed in the thumbnail display region 203, an indication that the thumbnails represent stored image files that were retrieved by a corresponding search may be output in the function display region 202.

The thumbnails 211 to 222 of the files stored in the storage unit 150 are displayed in the thumbnail display region 203. Further, a storage route of the file corresponding to each of the thumbnails 211 to 222 is displayed. In a case of the example embodiment of the present disclosure illustrated in FIG. 2, the storage routes of the files are displayed by patterns surrounding the thumbnails 211 to 222. Accordingly, the storage route 251 of the file corresponding to the thumbnail 211, the storage route 252 of the file corresponding to the thumbnail 214, and the storage route 253 of the file corresponding to the thumbnail 217 are displayed by different patterns. Further, the thumbnails 211, 215, 218, and 219 are surrounded with the same patterns, so that it means that the corresponding files have the same storage route.

Figure 3:
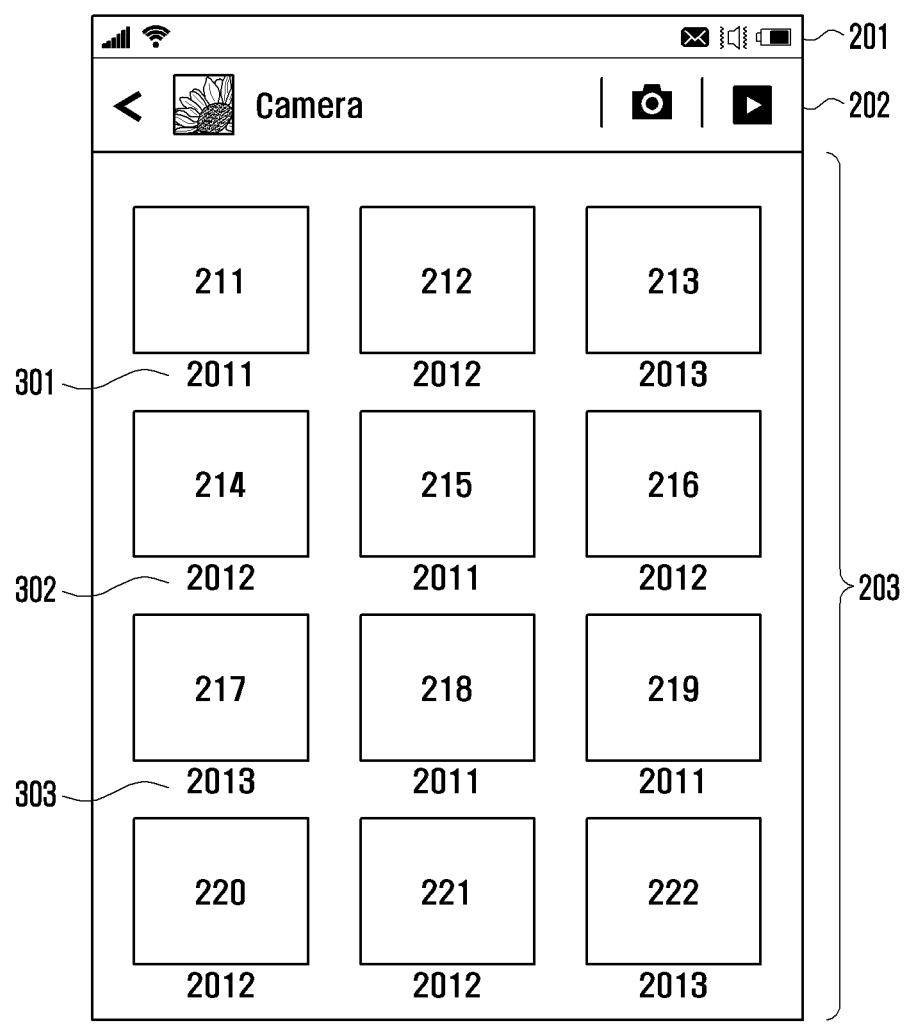
FIG. 3 is a diagram illustrating another example embodiment of thumbnails and storage routes displayed through a display unit.

FIG. 3 is a diagram illustrating another example embodiment of thumbnails and storage routes displayed through the display unit 140. FIG. 3 illustrates an alternative arrangement in which a name is used in place of a pattern to visually depict the storage route. Referring to FIG. 3, in order to show storage routes of files stored in the storage unit 150, instead of the patterns 251, 252, and 253 illustrated in FIG. 2, names 301, 302, and 303 of the lowest folder in which respective files are stored may be adjacently displayed to the respective thumbnails 211 to 222.

The embodiment of FIG. 3 notwithstanding, further examples discussed herein will be based on utilizing a pattern surrounding the thumbnail (as depicted in FIG. 2).

Returning now to FIG. 2, the thumbnails 211 to 222 and the storage routes 251, 252, and 253 may be displayed in the thumbnail display region 203 of the display unit 140. A movement command input for a specific thumbnail may be received. When the separate input unit 130 (of FIG. 1) is provided, the selection and movement command(s) for the thumbnail may be generated by, for example, inputs to a key pad or a mouse device. Alternatively, when the display unit 140 is implemented in a form of a touch display having the touch sensor unit 142 (of FIG. 1), the movement command may be generated by, for example, a "drag and drop" gesture operation to one of the thumbnails 211 to 222, via corresponding inputs to the touch-enabled display unit 140.

Figure 4:
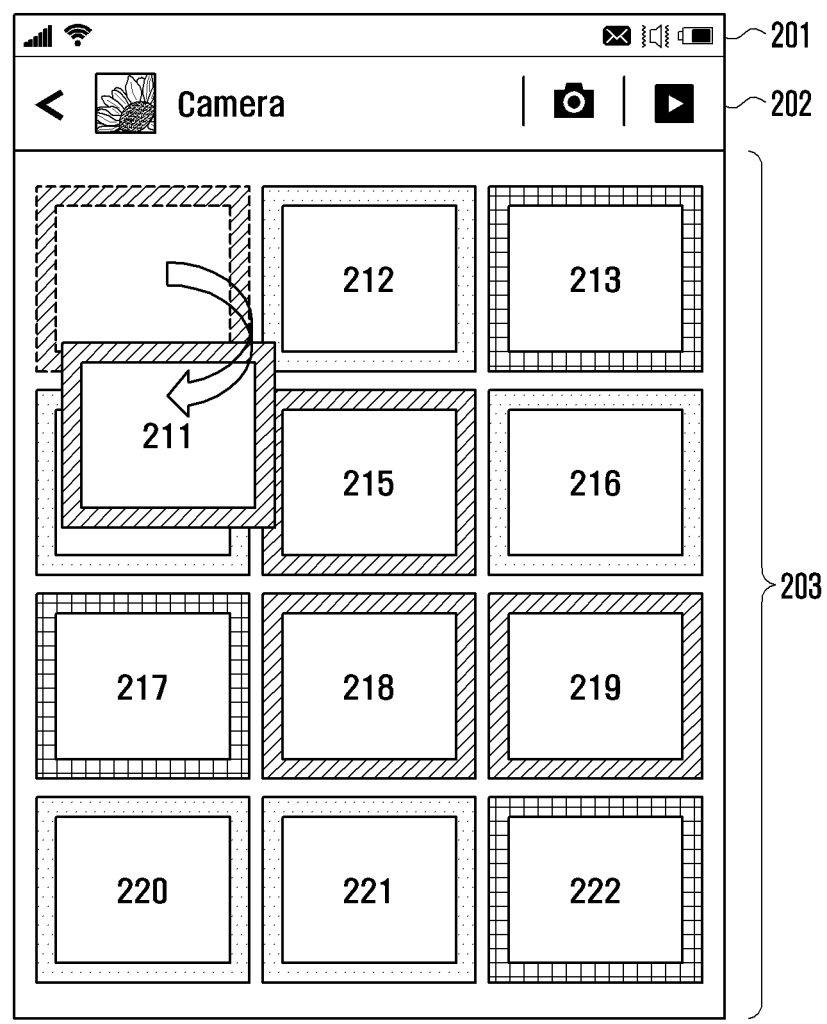
FIG. 4 is a diagram illustrating one example embodiment in which a displayed thumbnail moves.

FIG. 4 is a diagram illustrating one example embodiment in which a displayed thumbnail is moved.

Referring to FIG. 4, an example "drag" selection and movement command (via, for example, a keypad or a mouse) for the thumbnail 211 may be continuously input through the input unit 130, so that the controller 160 causes the thumbnail 211 to move to a display position of the thumbnail 214 (covered in FIG. 4), and updating the screen displayed by the display unit 140 to represent this movement. Alternatively, the controller 160 may cause the displayed position of the thumbnail 211 to be moved to the display position of the thumbnail 214 according to the drag and drop operation after a touch input to the displayed thumbnail 211, input through the display unit 140 that is the touch display.

Here, as illustrated in FIG. 4, when there is some ambiguity as to which thumbnail is intended to be overlapped (i.e., if thumbnail 211 overlaps several thumbnails), then a movement position of the thumbnail may be determined to be positioned "on" the thumbnail having the most overlapped area with the moved thumbnail relative to all competing thumbnails. When the display unit 140 is implemented by the touch display, a movement position of the thumbnail may be determined to be the position where the "drop" operation of the user is generated.

Next, when a moved or "first" thumbnail/file overlaps a display position of another or "second" thumbnail/file on the display unit 140, the controller 160 compares the storage routes of the files indicated by the two thumbnails and determines whether the storage routes are the same as each other. For example, in a case of the example embodiment illustrated in FIG. 4, the controller 160 determines whether a current storage route of the file 211 is the same as a current storage route of the file 214.

As a result of the comparison, when the storage route of the first file is different from the storage route of the second file, the controller 160 changes the storage route of the first file to the storage route of the second file.

For example, in the example embodiment illustrated in FIG. 4, the display position of the thumbnail 211 is moved to overlap the thumbnail 214. In response, the controller 160 changes the storage route (in the storage unit 150) of the file 211 to be identical to that of the file 214. Accordingly, the result is the file 211 and the file 214 have the same storage route.

In the meantime, the controller 160 may display a message for checking whether the storage route is changed by controlling the display unit 140 before changing the storage route of the file.

Figure 5:
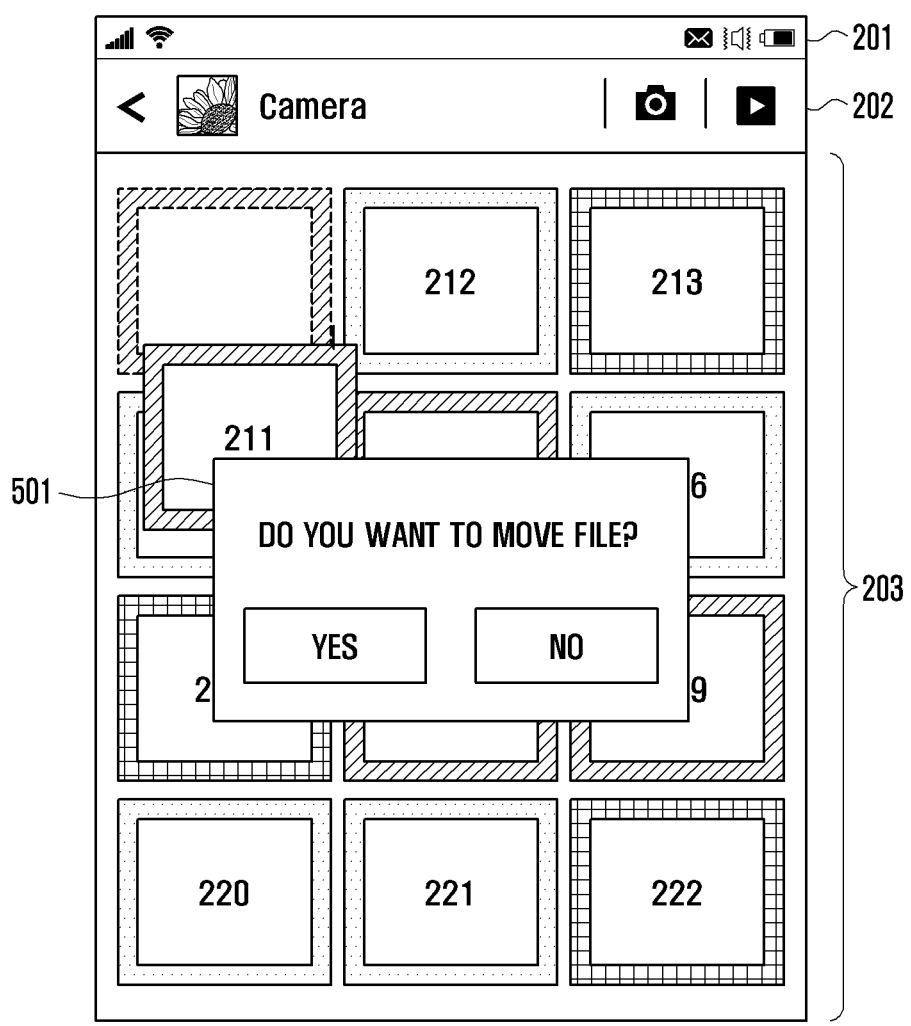
FIG. 5 is a diagram illustrating one example embodiment in which a message for changing a storage route of a file is displayed.

FIG. 5 is a diagram illustrating one example embodiment in which a message for changing a storage route of a file is displayed.

Referring to FIG. 5, the controller 160 may display a confirmation message 501 confirming whether to change the storage route of the file 211 via control of the display unit 140. The confirmation message may, in some embodiments, be displayed in a form of a pop-up window, as illustrated in FIG. 5. Naturally, the confirmation message 501, may be displayed in any of a variety of suitable forms for requesting a selective input from the user.

When "YES" is selected in the confirmation message 501, the controller 160 changes the storage route of the file 211 to be the identical to the storage route of the file 214. When "NO" is selected in the confirmation message 501, the controller 160 does not change the storage route of the file 211 and maintains the original storage route.

After the movement route of the file 211 is changed, the controller 160 changes the visual indicator of the storage route displayed around (or near) the thumbnail 211 via control the display unit 140.

Figure 6:
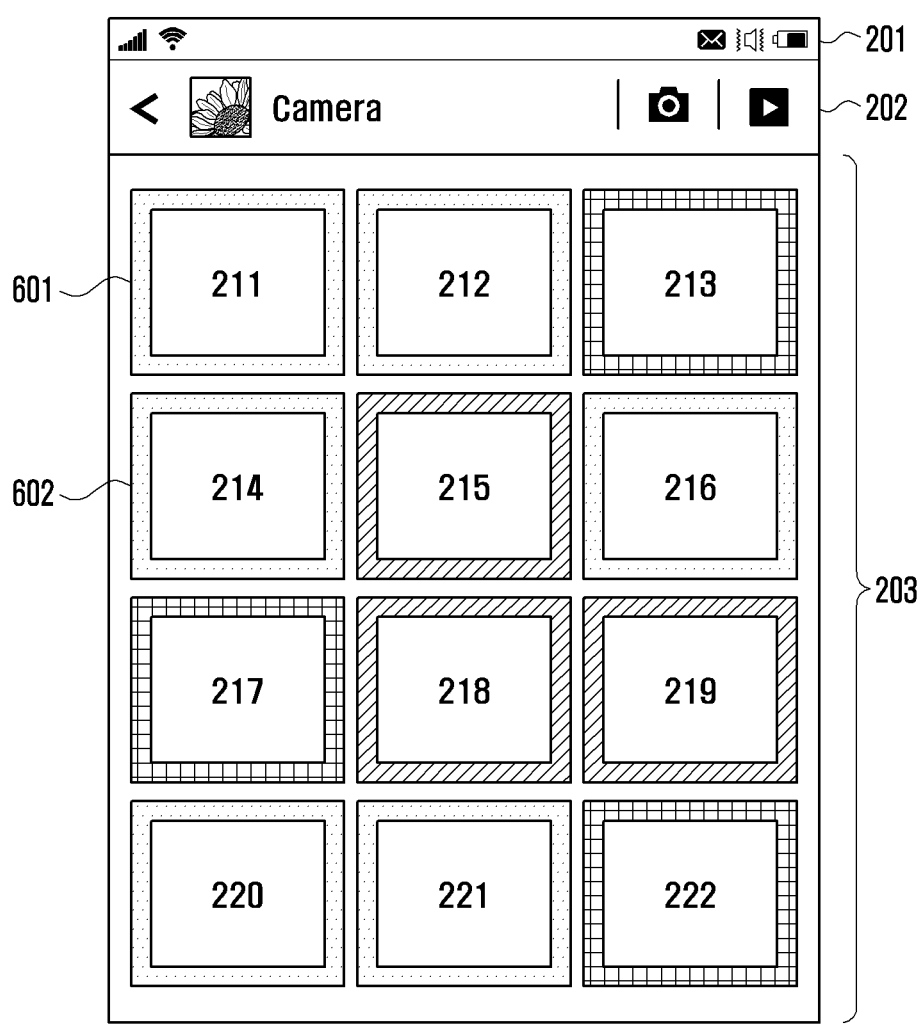
FIG. 6 is a diagram illustrating one example embodiment in which a changed storage route of a file is displayed.

FIG. 6 is a diagram illustrating one example embodiment in which a changed storage route of a file is displayed. Referring to FIG. 6, it can be seen that the visual indicator for the storage route 601 displayed for the thumbnail 211 has been altered to match the visual indicator for storage route 602, originally displayed together with the thumbnail 214.

After changing the storage route of the file/thumbnail, the controller 160 may restore the original display position of the first thumbnail, as illustrated by the file 211 of FIG. 6. Furthermore, the controller 160 may display a message notifying the user that the storage route of the file has been changed, via display on the display unit 140.

In the meantime, when it is not necessary to change the storage route of the first thumbnail because the current storage routes corresponding to the first thumbnail and the second thumbnails are the same, or when it is determined not to change the storage route of the first thumbnail because "NO" is selected in the confirmation message 501, the controller 160 restores the display position of the first thumbnail to the original position without performing any additional operations.

It is understood that the present disclosure is not limited to the above-described example, and may be applicable to a variety of situations, including, such as, a case in which storage routes of a plurality of files are changed simultaneously.

Figure 7:
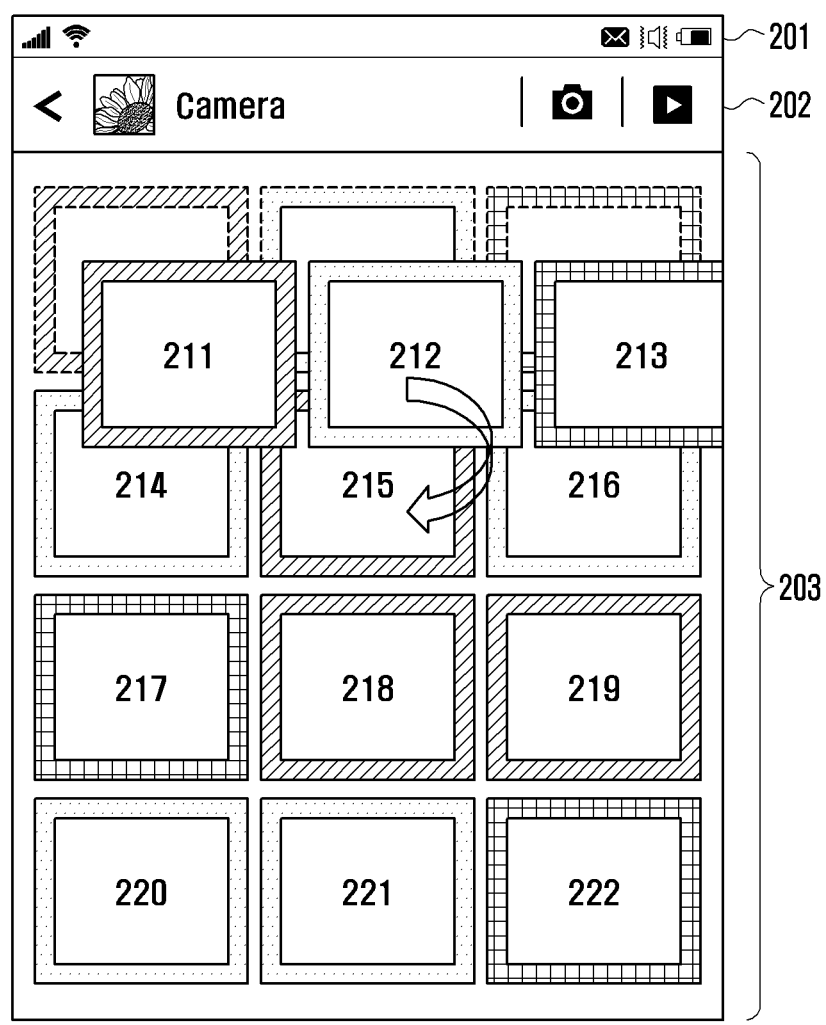
FIG. 7 is a diagram illustrating one example embodiment in which storage routes of a plurality of files are changed.

FIG. 7 is a diagram illustrating one example embodiment in which storage routes of a plurality of files are changed. Referring to FIG. 7, the thumbnails 211, 212, and 213 may move together toward the display position of the thumbnail 215 in response to the input movement command. In a case where the display unit 140 is implemented by the touch display, it is possible to move the plurality of thumbnails at one time by sequentially touching the thumbnails 211, 212, and 213 and then dragging and dropping the thumbnails at the display position of the thumbnail 215.

When the plurality of thumbnails 211, 212, and 213 move together to the position of the thumbnail 215, the controller 160 compares the storage routes of the moved thumbnails 211, 212, and 213 with the storage route of the thumbnail 215, and changes a storage route of any file if it has a storage route different from the storage route of the thumbnail 215.

For example, in FIG. 7, the thumbnail 211 and the thumbnail 215 have the same storage route, but the thumbnails 212 and 213 have different storage routes from thumbnail 215. Accordingly, the controller 160 changes the storage routes of the thumbnails 212 and 213 to be identical to that of the thumbnail 215. The aforementioned example embodiment may be identically applied to the processes of changing the storage route of the file indicated by each thumbnail and displaying the changed storage route.

Figure 8:
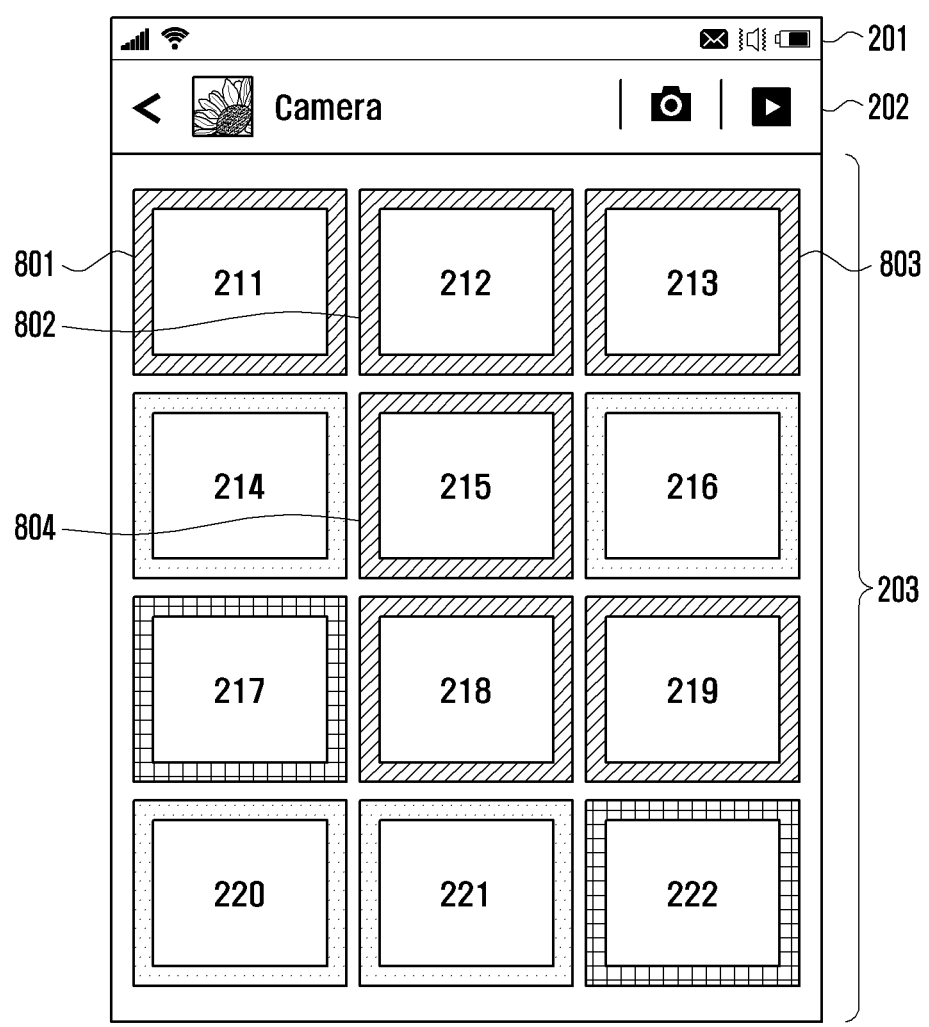
FIG. 8 is a diagram illustrating one example embodiment of a result of a change in a plurality of files.

FIG. 8 is a diagram illustrating a result of the above-described example of FIG. 7. Referring to FIG. 8, a storage route 801 displayed together with the thumbnail 211 is maintained to be identical to the storage route before the movement, and storage routes 802 and 803 displayed together with the thumbnails 212 and 213 are changed to be identical to a storage route 804 displayed together with the thumbnail 215 to be displayed.

Figure 9:
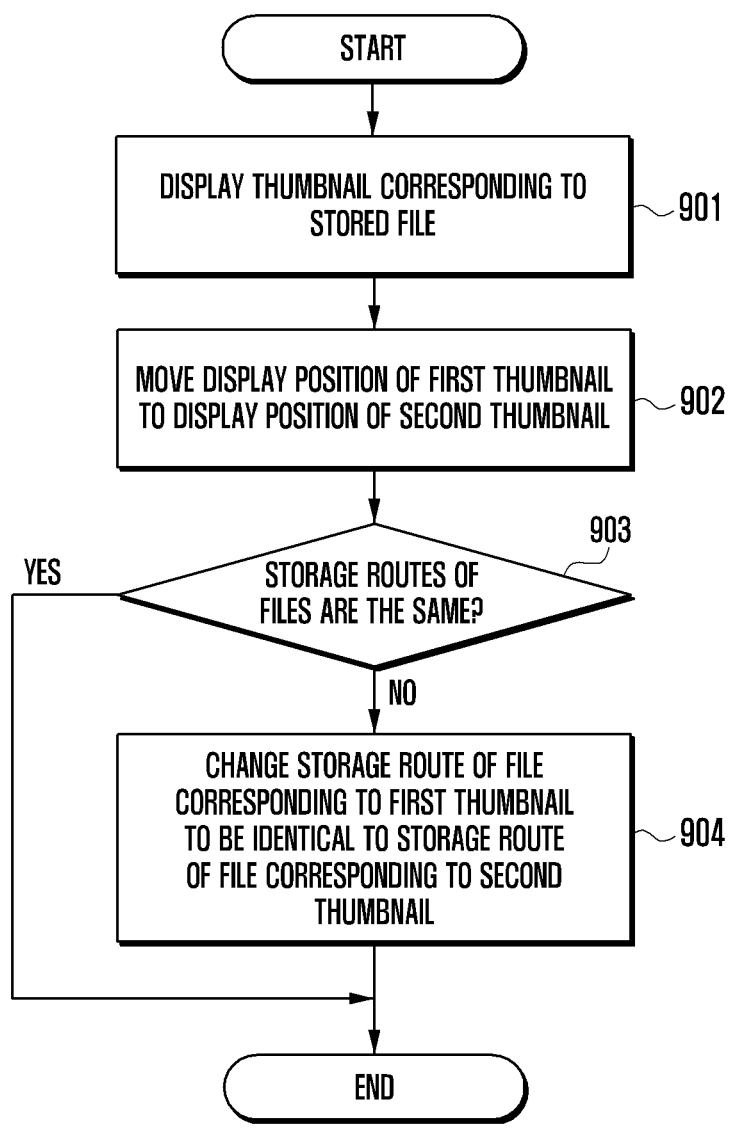
FIG. 9 is a diagram illustrating a process of changing a storage route of a file according to an example embodiment.

FIG. 9 is an example sequence of steps for changing a storage route of a file according to an example embodiment.

Referring to FIG. 9, in step 901, the controller 160 displays a thumbnail corresponding to a file stored in the terminal via the display unit 140.

In step 902, a movement command is received and executed, moving the display position of the first thumbnail to a display position of a second thumbnail.

In step 903, the controller 160 detects whether storage routes of the respective files are the same.

In step 904, when the storage routes of the files are different, the controller 160 changes the storage route of the moved file (corresponding to the first thumbnail) to be identical to the storage route of the target file (corresponding to the second thumbnail) in step 904. Furthermore, the controller 160 may display the changed storage route through the display unit 140

If the storage routes of the files are the same, the controller 160 ends the process without performing step 904.

The same elements may be designated by the same reference numerals in the accompanying drawings. Further, in the following description of the present disclosure, a detailed description of known functions and configurations incorporated herein will be omitted when it may make the subject matter of the present disclosure rather unclear.

Further, in describing example embodiments of the present disclosure, the present disclosure may be applied to a variety of portable and non-portable terminals, such as desktop computers, servers, to mobile phones and personal data assistants. Any such terminal may be utilized where a similar technique may be implemented, through a slight modification without departing from the ambit of the present disclosure, as will be understood by those skilled in the art.

In describing the example embodiment of the present disclosure, a "file" and a "thumbnail" indicating the file may be used as the same meaning, and a "storage route" of a file and a "pattern and other indication display" indicating the storage route may also be used as the same meaning.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Those skilled in the art can appreciate that it is possible to implement the present disclosure in another specific form without changing the technical idea or the indispensable characteristics of the present disclosure. Therefore, it should be understood that the above-described embodiments are illustrative and are not limiting under any possible interpretation. The ambit of the present disclosure is defined by the appended claims to be described later, rather than the detailed description. Accordingly, it should be appreciated that all modifications or variations derived from the meaning and ambit of the appended claims and their equivalents are included in the range of the present disclosure.

Meanwhile, although example embodiments of the present disclosure have been shown and described in this specification and the drawings, they are used in general sense in order to easily explain technical contents of the present disclosure, and to help comprehension of the present disclosure, and are not intended to limit the ambit of the present disclosure. It is obvious to those skilled in the art to which the present disclosure pertains that other modified embodiments on the basis of the ambit of the present disclosure besides the embodiments disclosed herein can be carried out.

What is claimed is:

1. A method of managing a file storage of a terminal, comprising:
    displaying thumbnails, each thumbnail representing at least one file stored in the terminal and displaying a visual indicator of each storage route for each thumbnail;
    in response to a movement command, changing a display position of a selected first thumbnail to at least part of a display position of a second thumbnail;
    detecting whether a first storage route of a first file of the first thumbnail is identical to a second storage route of a second file of the second thumbnail;
    when the first storage route is not identical to the second storage route, changing the first storage route to the second storage route for the first file; and
    automatically moving the first thumbnail to an original display position after the first storage route is changed to the second storage route.

2. The method of claim 1, wherein changing the display position further comprises:
    displaying the first thumbnail and the second thumbnail such that the first thumbnail overlaps the second thumbnail.

3. The method of claim 1, further comprising:
    displaying a confirmation query requesting affirmative confirmation to change the first storage route to the second storage route.

4. The method of claim 1, wherein the visual indicator includes at least one of a color, a pattern and a label.

5. The method of claim 1, wherein the movement command is a "drag and drop" gesture based on a touch input received by a touch display.

6. The method of claim 1, wherein the movement command is a "drag and drop" input based on an input generated by a pointer device.

7. The method of claim 1, further comprising:
    in response to a movement command, changing a display position of a selected plurality of thumbnails to at least part of a display position of the second thumbnail;
    detecting whether each storage route of each file of the plurality of thumbnails is identical to the second storage route of the second file of the second thumbnail; and
    when the each storage route is not identical to the second storage route, changing each respective storage route for each file of the plurality of thumbnails to the second storage route.

8. An electronic device for managing files, comprising:
    a display unit configured to display thumbnails representing files stored in the electronic device, and display a visual indicator of each storage route for each thumbnail; and
    a controller configured to:
    in response to a movement command, change a display position of a selected first thumbnail to at least part of a display position of a second thumbnail,
    detect whether a first storage route of a first file of the first thumbnail is identical to a second storage route of a second file of the second thumbnail,
    when the first storage route is not identical to the second storage route, changing the first storage route to the second storage route for the first file, and
    automatically moving the first thumbnail to an original display position after the first storage route is changed to the second storage route.

9. The electronic device of claim 8, wherein changing the display position further comprises:
    displaying the first thumbnail and the second thumbnail such that the first thumbnail overlaps the second thumbnail.

10. The electronic device of claim 8, the controller further configured to display a confirmation query requesting affirmative confirmation to change the first storage route to the second storage route.

11. The electronic device of claim 8, wherein the visual indicator includes at least one of a color, a pattern and a label.

12. The electronic device of claim 8, wherein the movement command is a "drag and drop" gesture based on a touch input received by a touch display.

13. The electronic device of claim 8, wherein the movement command is a "drag and drop" input based on an input generated by a pointer device.

14. The electronic device of claim 8, the controller further configured to:
    in response to a movement command, change a display position of a selected plurality of thumbnails to at least part of a display position of the second thumbnail;
    detect whether each storage route of each file of the plurality of thumbnails is identical to the second storage route of the second file of the second thumbnail; and
    when the each storage route is not identical to the second storage route, change each respective storage route for each file of the plurality of thumbnails to the second storage route.

* * * * *